Figure 6:
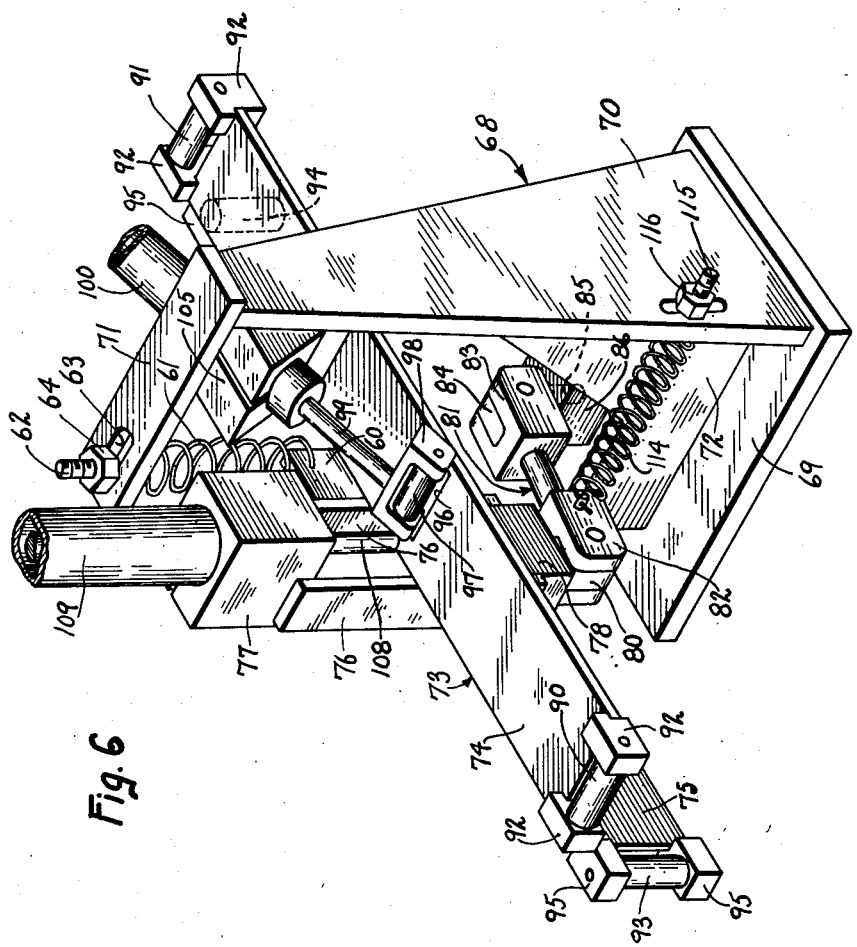

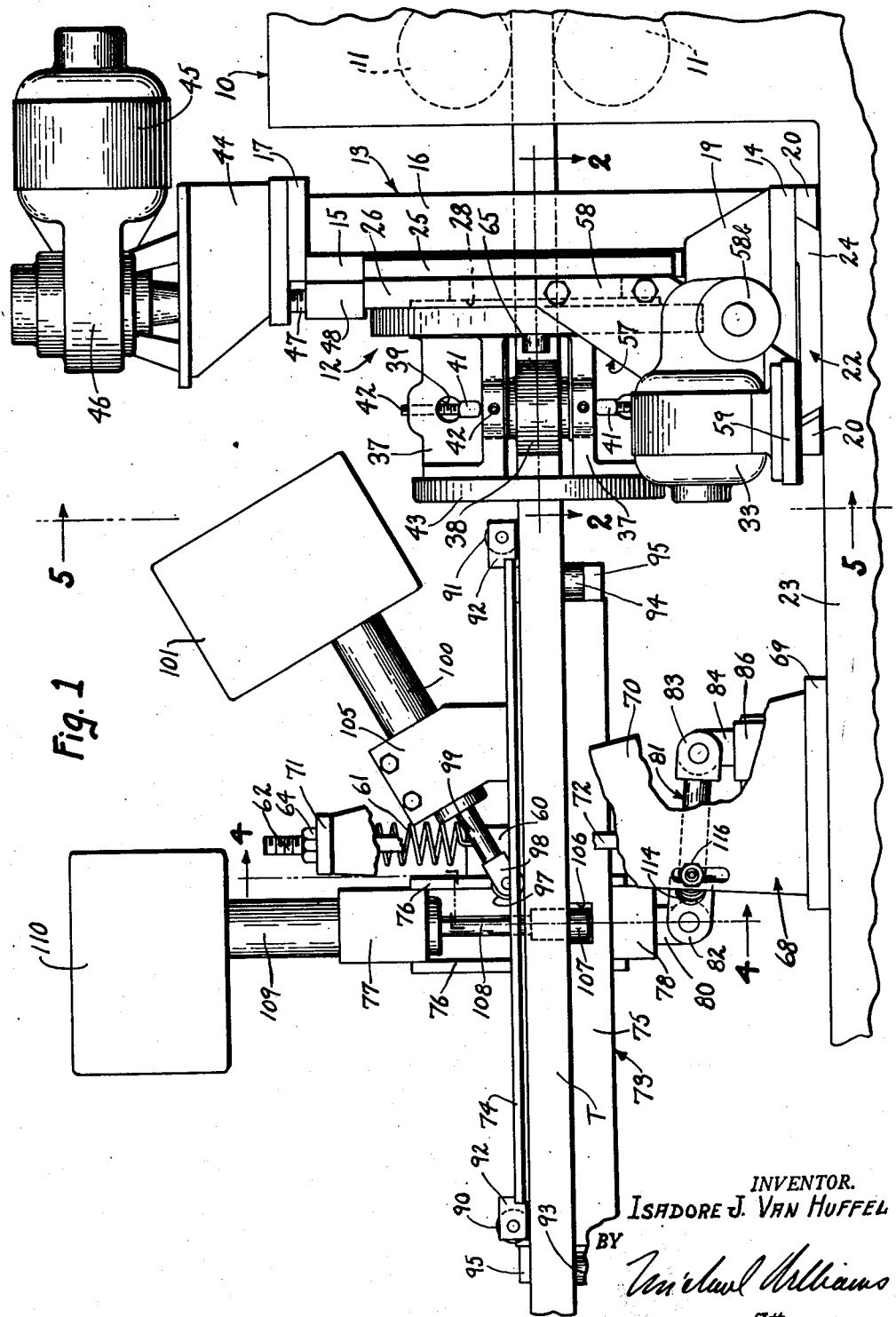

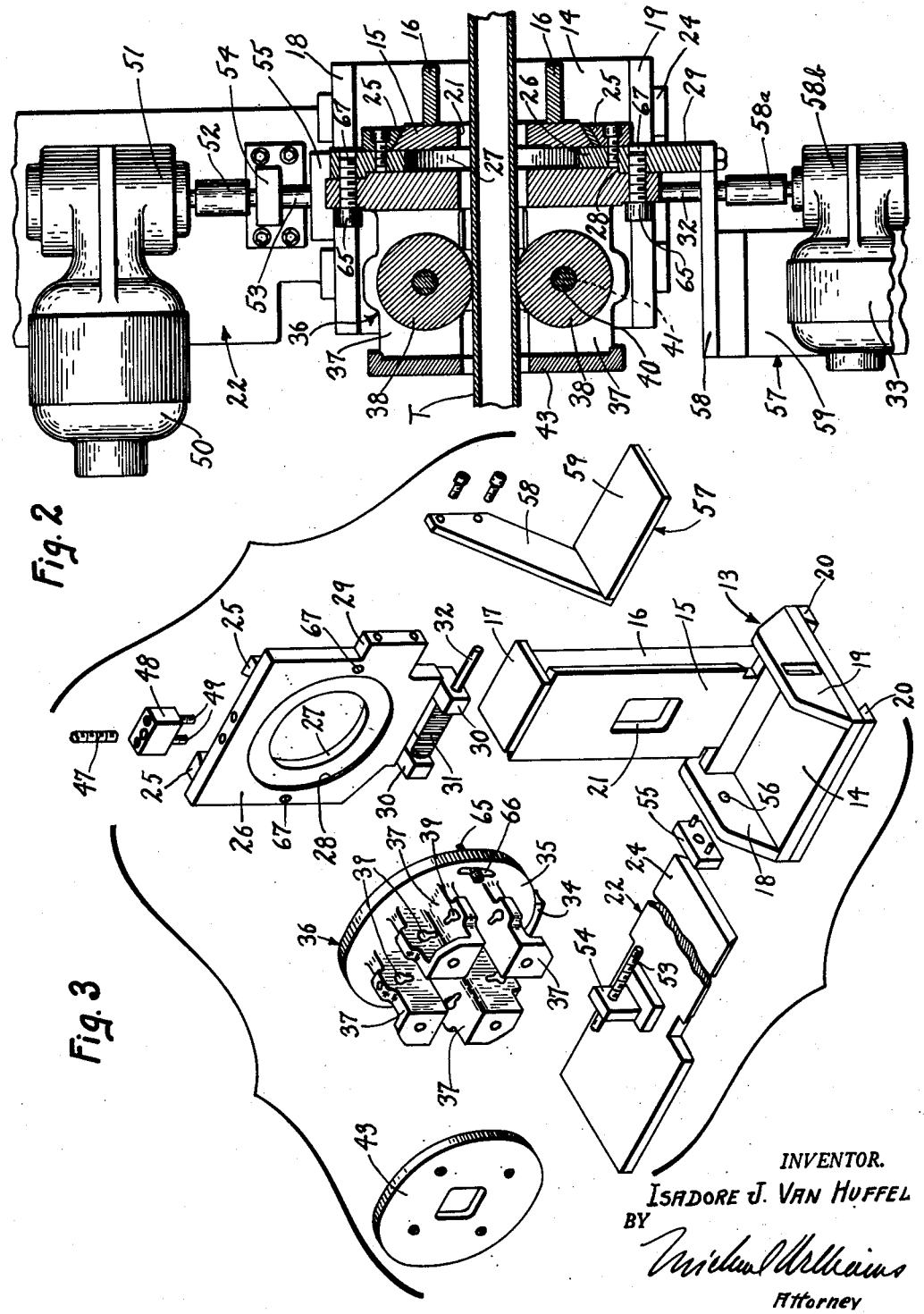

June 16, 1953
I. J. VAN HUFFEL
2,642,115
STRAIGHTENING APPARATUS
Filed March 28, 1951
5 Sheets-Sheet 3
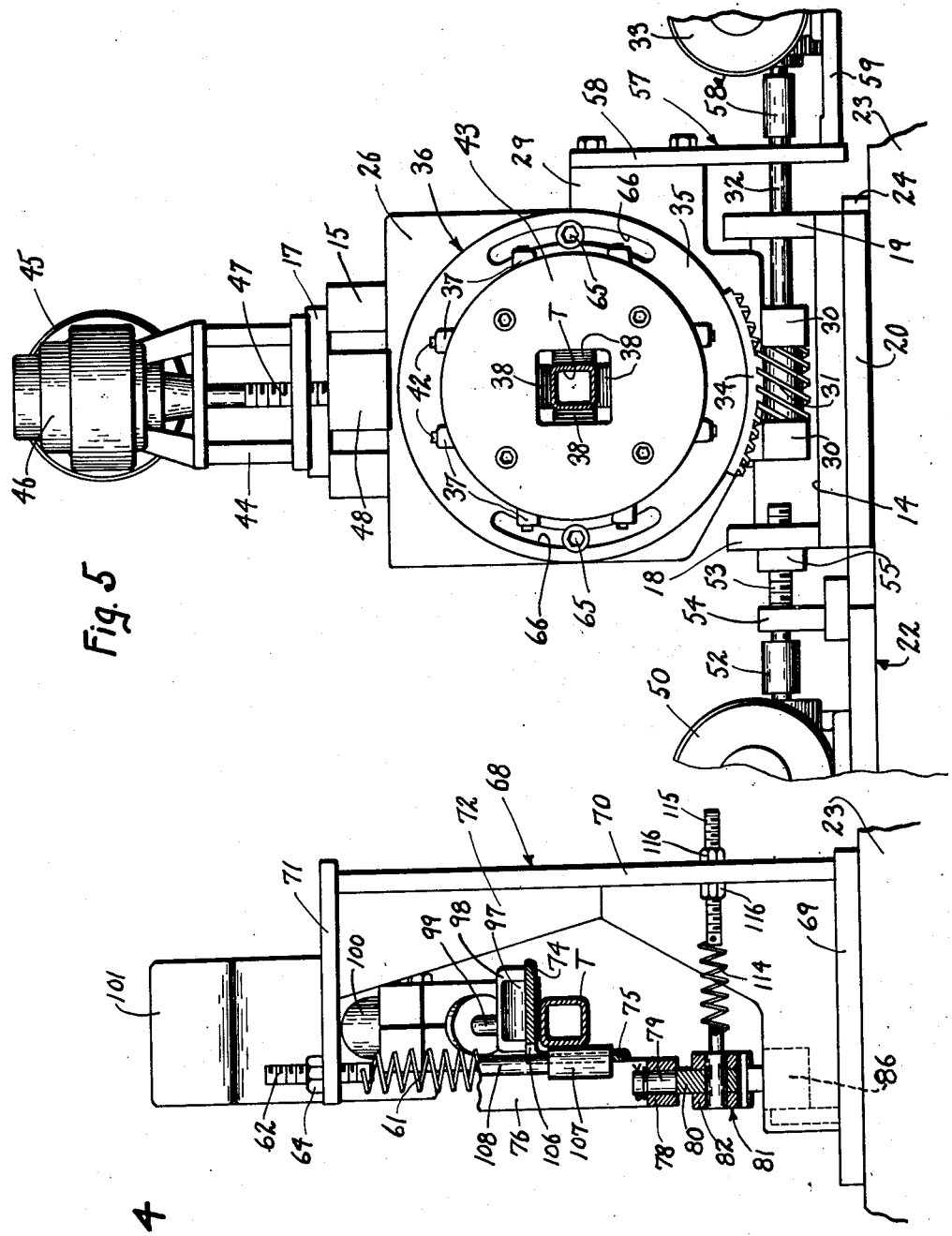
INVENTOR.
ISADORE J. VAN HUFFEL
BY
Michael Williams
Attorney June 16, 1953     I. J. VAN HUFFEL     2,642,115
STRAIGHTENING APPARATUS Filed March 28, 1951     5 Sheets-Sheet 4

INVENTOR.
ISADORE J. VAN HUFFEL
BY
Michael Williams
Attorney

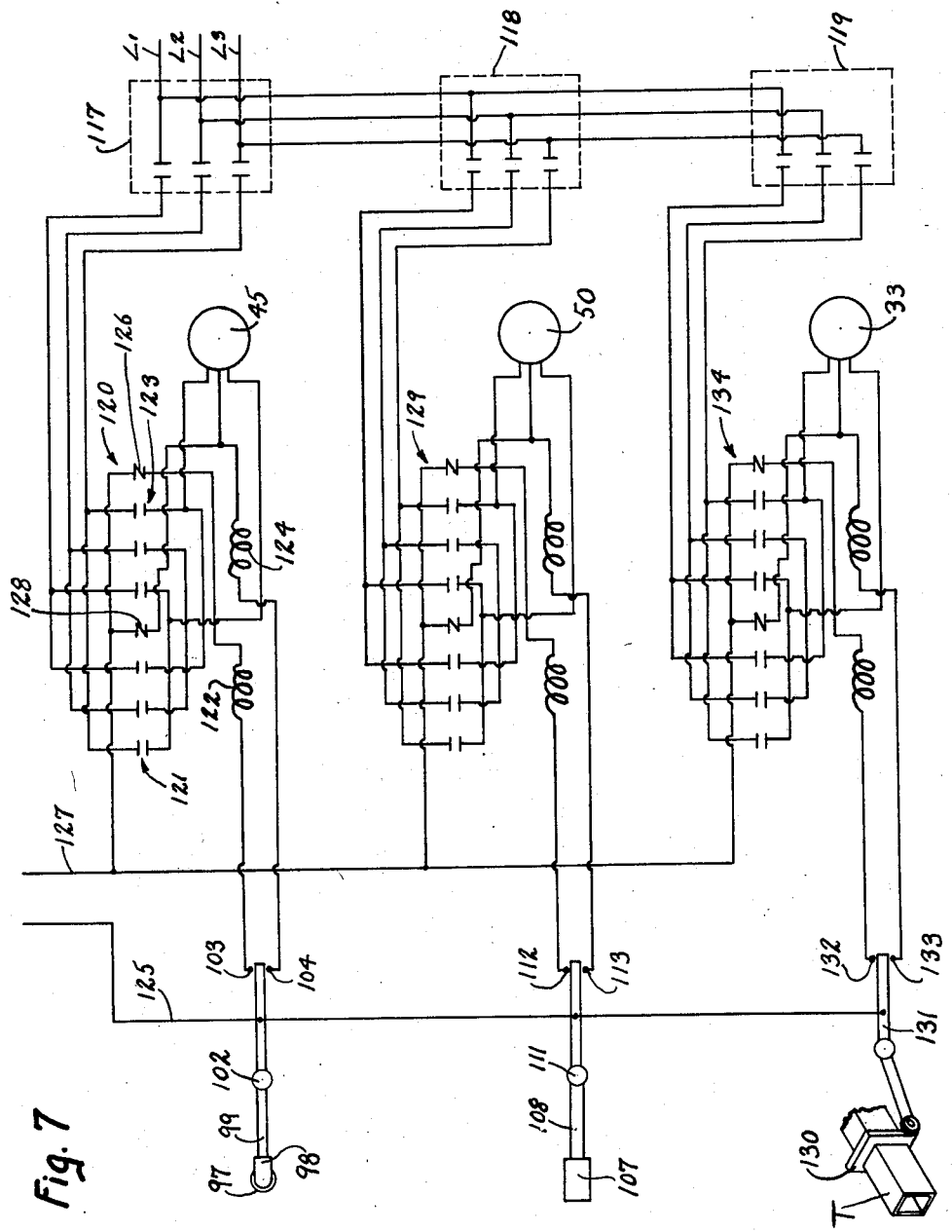

Patented June 16, 1953

2,642,115

UNITED STATES PATENT OFFICE 2,642,115

STRAIGHTENING APPARATUS

Isadore J. Van Huffel, Warren, Ohio, assignor to Van Huffel Tube Corporation, Warren, Ohio, a corporation of Ohio Application March 28, 1951, Serial No. 217,979

11 Claims. (Cl. 153—50)

My invention relates to straightening apparatus, more particularly to apparatus for use with machines for processing elongated material, such as tubing, shapes, forms and the like, and the principal object of my invention is to provide new and improved apparatus of such character.

In present day manufacture of tubing no reliable provision is made for maintaining the tube in rectilinear formation and preventing twists in the tube as it leaves the forming machine and consequently the tubing must be straightened and untwisted in a subsequent operation. Frequently, subsequent operations affect the quality of the tubing with the result that the value of the tubing is impaired. My invention provides means which act on the tubing as it is formed, thus eliminating need for any subsequent operations and accordingly reducing the cost of production. It will be understood, of course, that my invention is not limited to use with tubing, and that it may be used for operation on any other elongated material, such as metal shapes and forms, with equal facility.

In the drawings accompanying this specification and forming a part of this application, there is shown, for purposes of illustration, an embodiment which my invention may assume, and in these drawings:

Figure 1 is a side elevational view of apparatus embodying my invention,

Figure 2 is a fragmentary horizontal sectional view corresponding generally to the line 2—2 of Figure 1, Figure 3 is an exploded perspective view of certain parts included in the apparatus, Figure 4 is a fragmentary sectional view corresponding generally to the line 4—4 of Figure 1, Figure 5 is a fragmentary sectional view corresponding generally to the line 5—5 of Figure 1, Figure 6 is a fragmentary perspective view of control means embodied in the apparatus of my invention, and Figure 7 is a diagrammatic view illustrating electrical connections.

My invention is particularly adapted for use with a tube forming machine and the disclosure herein will be directed to this combination, although it will be apparent that a machine for processing metal shapes and forms may equally well be used with my invention. The tube forming machine 10, fragmentarily shown in the drawings, may be of any well known construction and therefore need not be shown or described in detail. In certain forming machines strip metal is fed into the machine and by a series of roller stations such strip is bent into tube form and is then passed between weld rolls and welded by the electric resistance method. Thereafter, the welded tubing is operated on by one or more series of rolls which size and shape the tubing, and the latter rolls are designated by the numeral 11 in Figure 1. Ordinarily, the finished tubing emerges from the forming machine and is cut into desired lengths.

In accordance with the present invention, straightening apparatus 12 is positioned adjacent to the leaving end of the forming machine 10, such apparatus being adapted to act on the tubing and maintain it in predetermined condition.

As seen in Figures 1, 2, 3 and 5, the apparatus 12 herein disclosed comprises a slide 13 having a base 14 and an upright back 15. Ribs 16 are welded in position to strengthen the connection of base 14 with back 15 and to impart rigidity to the slide 13. A platform 17 is welded to the uper end of the back 15 and ribs 16 for a purpose later to appear. Wings 18 and 19 extend upwardly from opposite ends of the base 14 and gibs 20 are secured in spaced-apart relation to the undersurface of the base. The back 15 is formed with an aperture 21 through which the tubing is adapted to pass.

The slide 13 is mounted for sliding movement on a plate 22 which is adapted to be secured to a suitable stationary support 23, the plate 22 having a tenon portion 24 adapted to fit in dove-tail relation with the mortise formed by the gibs 20. Thus, the slide 13 may move along the tenon portion 24, and such movement is transverse to the line of travel of the tube T.

The upright side edges of back 15 are bevelled to provide a dove-tail tenon which is slidably receivable between gibs 25—25 secured in spaced-apart relation to the back of a mounting plate 26 which may be considered as a second slide. The plate 26 is formed with an aperture 27 which is counterbored as shown at 28. An extension 29 projects from an upright edge of the plate for a purpose later to appear, and a pair of spaced lugs 30—30 extend downwardly from the lower margin of the plate 26.

Journalled between the lugs 30 is a worm 31, a shaft 32 extending from the worm and having connection with a reversible electric motor 33 for purposes of rotating the worm. A worm gear segment 34 is secured to the peripheral surface of a circular plate 35 which forms part of a head 36. The rear surface of the plate 35 is adapted to bear against the front surface of the mounting plate 26, and this rear surface is formed with an annular undercut shoulder fitting within the counterbore 23 to hold the head 36 to true rotation with respect to the mounting plate 26.

Extending forwardly from the front surface of the head plate 35 are four projections 37, each angular in cross-section, the projections being spaced about the center of the plate 35 to provide bearings for four rolls 38 which are disposed in cluster arrangement and are adapted to engage four radially spaced-apart portions of the tube. As herein disclosed, the tube is of square cross-section and accordingly each of the four rolls is formed with a flat peripheral surface for engagement with a respective side of the tube. However, it will be appreciated that tubing of other cross-sectional contour may be processed by my apparatus. For example, round tubing may be processed, and in such event each of the rolls 38 will have a concave peripheral contour for engagement with radially spaced-apart portions of the tube. Further, if metal shapes and forms are being processed, it will be appreciated that the rolls 38 will be of suitable number, configuration and disposition to properly engage the particular shape or form being processed.

Each leg of a projection 37 is formed with a keyhole aperture 39, the larger part of the aperture being adapted to pass the diameter of a roll-supporting shaft 40, and the smaller part of the aperture being adapted to closely receive a respective one of the flattened ends 41 of such shaft. Thus, with a roll 38 between adjoining legs of a pair of projections 37, a shaft may be moved endwise through the larger part of one aperture 39, through the aperture in the roll, and through the larger part of an aligned aperture 39, and the flattened ends 41 of the shaft may be aligned with the smaller parts of the apertures and moved into position therein. Set screws 42 (see Figure 1) maintain the shafts 40 in position. A plate 43 is suitably secured to the terminal ends of the projections 37 to impart rigidity to the structure, and this plate is apertured to pass the tubing.

A bracket 44 is secured to the platform 17 and this bracket supports a reversible electric motor 45 which is provided with a gear reduction unit 46. The shaft of the gear unit extends downwardly toward the mounting plate 26 and its extremity 47 is threaded for reception in a nut 48. The nut 48 is secured to the upper margin of the plate 26 by means of bolts 49. Thus, the motor 45, depending upon rotation of its shaft, is adapted to raise or lower the mounting plate 26 and the head 36 connected to the mounting plate, this movement being in a direction transverse to the line of movement of the tube.

The slide 13, plate 26 and head 36 carried by the slide, are mounted for movement transverse to the line of movement of the tube, this movement also being transverse to the hereinbefore described movement of the plate 26 and head 36, and in the present instance the two movements are at right angles to each other. As herein disclosed, a reversible electric motor 50 is supported by the plate 22, the shaft of the motor being connected to a gear reduction unit 51. The operating shaft of the unit 51 is coupled, by means of coupling 52, to a shaft 53 which is journalled in a bearing 54 extending upwardly from the plate 22.

The extremity of the shaft 53 is threaded, as best seen in Figure 3, and this threaded portion cooperates with a nut 55 which is secured to the wing 18 of the slide 13. An aperture 56 is formed in the side wing to provide for extension of the shaft 53. Thus the motor 50, depending upon rotation of its shaft, is adapted to move the slide 13, and plate 26 and head 36, horizontally in one direction or the other along the tenon 24 formed as part of the plate 22.

A bracket 57, having angularly disposed legs 58, 59 is secured to the mounting plate 26 for movement therewith, and in the embodiment disclosed, the leg 58 is bolted to the extension 29 of the plate 26 and the leg 59 is disposed in offset relation to provide a platform to which is secured a reversible electric motor 33. The shaft of the motor 33 is connected to a reduction gear unit 58b, and the shaft of the unit 58b is coupled, by coupling 58d, to the shaft 32 which is connected to the worm 31.

The head 36 is held to the mounting plate 26 by means of two bolts 65 which pass through arcuate slots 66 in the circular plate 35 and are threaded in apertures 67 formed in the plate 26, the bolts 65 permitting rotative movement of the head 36 in an amount defined by the length of the slots 66. Thus the motor 33, depending upon rotation of its shaft, is adapted to rotate the head in one direction or another, through means of the worm 31 meshing with the worm wheel segment 34, to provide adjustment to compensate for any twisting action of the tubing as it is formed.

Means for controlling action of the straightening apparatus is preferably positioned forwardly of such apparatus, and as herein disclosed such means is carried by a standard 68 which is secured to a support which may be the same support which carries the straightening apparatus. The standard 68 comprises a base 69, an upright portion 70, and an upper arm 71 overhanging the base 69. A gusset plate 72 is welded to the parts comprising the standard to impart rigidity thereto.

An elongated member 73 is adapted to be yieldably supported in juxtaposition to the line of travel of the tubing as it leaves the forming machine and the straightening apparatus, and as herein disclosed such member is of angle cross-section to provide two legs 74 and 75. The leg 74 is adapted to overlie the tubing and the leg 75 is adapted to be positioned along a side of the tubing.

The elongated member 73 is pendulously supported in juxtaposition with respect to the line of travel of the tubing, and in the present embodiment the support comprises a lug 60 which is welded to the member and a coil spring 61 which has its lower end connected to the lug 60 and its upper end connected to a bolt 62 which extends through a slot 63 in the upper arm 71 of the standard 68. An adjusting nut 64 is threaded on the bolt 62 and bears against the top surface of the upper arm 71.

Welded in spaced-apart relation at substantially the midpoint of the elongated member 73 are two upright cleats 76—76 having their upper ends connected, as by welding, to a split clamp 77. The lower ends of the cleats 76 are spanned by a lug 78 which is apertured to pass the stud 79 of a connector, the stud being integral with an apertured lug 80 to form the connector.

A link 81, having spaced furcated portions 82, 83, is adapted to provide for stability of the elongated member 73 and as herein disclosed, the furcation 82 is pivotally connected to the lug 80 and the furcation 83 is pivotally connected to a lug 84. The lug 84 is formed integrally with a stud 85 which is journalled in a block 86 secured to the base 69. Thus, the elongated member is yieldably held against undesirable movement in a direction longitudinally of the line of movement of the tubing.

Rollers 90, 91 are journalled between lugs 92 at each end of the leg 74 of the member 73, and rollers 93, 94 are journalled between lugs 95 at each end of the leg 75. Rollers 91, 94 are adapted to engage radially spaced portions of the tubing and rollers 90, 93 are also adapted to engage radially spaced portions of the tubing, the latter portions being longitudinally spaced from the first named portions. A coil spring 114 has one end connected to the link 81 and its other end connected to a threaded stud 115 carried by the upright portion 70 of the standard 68, jam nuts 116 being threaded on the stud 115 and bearing against opposite sides of the upright portion to maintain the stud in selected spring tensioning position.

Intermediate the length of the member 73, the leg 74 thereof is formed with a slot 96 through which a roller 97 is adapted to work. The roller 97 is carried by furcations 98 formed on a rod 99 which extends through a tube 100 and into a switch housing 101 which contains electrical switching apparatus of a suitable commercially available type. Generally, the rod 99 is pivotally mounted, as at 102 (see Figure 7) and an extremity is adapted to engage one or the other of switch contacts 103, 104. The tube 100 is supported by a split clamp 105 carried by the leg 74 of the member 73.

A slot 106 is formed in the leg 75 intermediate its length, and a roller 107 is adapted to work through the slot. The roller 107 is carried at the end of a rod 108 which extends through a tube 109 and into a switch housing 110 which contains electrical switching apparatus which may be similar to that hereinbefore mentioned. The tube 109 is supported by the split clamp 77. As seen in Figure 7, the rod 108 is pivoted, as at 111, and an extremity is adapted to engage one or the other of switch contacts 112, 113.

From the foregoing, it will be appreciated that rollers 90, 91 will be yieldably maintained in engagement with spaced longitudinal portions of the upper surface of the material being processed, such as the tubing or metal shape or form, and rollers 93, 94 will be yieldably urged into engagement with spaced longitudinal portions of the side surface of the material being processed. The roller 97 is so positioned that if the portion of the tubing or other material between rollers 90, 91 is other than rectilinear, the contact portion of rod 99 will be moved into engagement with one or the other of contacts 103, 104, depending upon whether the tubing is vertically bowed upwardly or downwardly. Likewise, the roller 107 is so positioned that if the portion of the tubing or other material between rollers 93, 94 is other than rectilinear, the contact portion of rod 108 will be moved into engagement with one or the other of contacts 112, 113 depending upon which direction the tubing is horizontally bowed.

The switching apparatus hereinbefore described is adapted to operate the electric motors 45, 50 to shift the support for the cluster rolls 38 to and fro in proper vertical and horizontal directions in accordance with conditions of the tubing between rolls 90, 91 and 93, 94.

Referring particularly to the electrical diagram illustrated in Figure 7, line wires L1, L2 and L3 are connected in parallel with three manual starter switches 117, 118 and 119. Line wires from switch 117 extend to a mechanically interlocked magnetic reversing starter 120 for controlling operation of motor 45. The starter comprises three normally open contacts 121, controlled by a solenoid 122, and adapted when closed to cause energization of the motor 45 in a direction to vertically move the cluster rolls 38 in proper direction, and further comprises three normally open contacts 123, controlled by a solenoid 124, and adapted when closed to cause energization of the motor 45 in an opposite direction to vertically move the cluster rolls 38 in the opposite direction.

In operation, and assuming that portion of the tubing between rolls 90, 91 is bowed, the roll 97 will be moved by such bowed portion and will move, for example, the contact portion of arm 99 into engagement with contact 103. The electrical circuit may then be traced from control circuit line wire 125, contact 103, solenoid 122, normally closed contact 126 to control circuit line wire 127. The solenoid 122 will thus be energized and will close the three contacts 121. Such action will cause electrical energy to flow from line wires L1, L2 and L3 to the motor 45 in relation to cause the motor shaft to rotate in a certain direction and thereby cause proper vertical movement of the cluster rolls 38.

In the event the bowing of the tube portion between rolls 90, 91 is opposite to that hereinbefore considered, the contact portion of rod 99 will be moved into engagement with contact 104. The electrical circuit may then be traced from line wire 125, contact 104, solenoid 124, normally closed contact 128 and line wire 127. The solenoid will thus be energized and will close the three contacts 123. Such action will cause electrical energy to flow from line wires L1, L2 and L3 to the motor 45 in relation to cause the motor shaft to rotate in a direction opposite to that before mentioned, and thereby cause proper vertical movement of the cluster rolls 38 in a direction opposite to that effected when contact 103 is engaged by the contact portion of rod 99.

A mechanically interlocked magnetic reversing starter 129 is provided for controlling reverse operations of the motor 50. The starter 129 is in all respects similar to the starter 121 and its operation will be understood from previous description.

In cases where twisting of the tubing or other material is to be controlled, means may be provided for controlling the motor 33 to prevent undesirable twisting of the material as it is processed. In the case of non-circular tubing, such as square tubing, a guide 130 (see Figure 7) may be positioned to pass the moving tubing, the guide having link connection with a switch similar to switches hereinbefore specified, so as to move an operating rod 131 to engagement with one or the other of contacts 132, 133. In case of other shapes or forms, the guide 130 will be formed in accordance with the respective shape or form being processed. A magnetic reversing starter 134, similar to the starters hereinbefore mentioned, is provided to control reverse operations of the motor 33.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. Straightening apparatus for use with a machine which continually processes and feeds elongated work, comprising: head means through which the work passes as it leaves said processing machine, said head means being shiftable transversely of the line of travel of said work; contact means positioned in the path of movement of said work and engageable with the work as the latter moves therepast, said contact means being supported for movement transverse to the line of movement of said work whereby it may follow any deviation from rectilinear formation of said work; and means affected by movement of said contact means for shifting said head means in proper amount and direction so that said head means acts on the moving work and corrects for deviation from rectilinear formation.

2. Straightening apparatus for use with a machine which continually processes and feeds elongated work, comprising: head means engageable with the work, and through which the work passes as it leaves said processing machine, said head means being shiftable transversely of the line of travel of said work; and control means for controlling shifting movement of said head means, comprising an elongated member, a pair of contact means carried in spaced-apart relation by said member, means yieldably supporting said member in juxtaposed relation with respect to the line of work travel and providing for engagement between said contact means and the work as the latter passes said contact means, an intermediate contact disposed intermediate said pair of contact means and carried by said member and positioned in the path of movement of said work, and engageable with the work as it moves therepast, said intermediate contact means being supported for movement transverse to the line of movement of said work whereby it may follow any deviation from rectilinear formation of the work, and further comprising operating means affected by movement of said intermediate contact means for controlling shifting movement of said head means in proper amount and direction so that said head means acts on the moving work and corrects for deviation from rectilinear formation.

3. Straightening apparatus for stock advancing in a longitudinal direction, comprising: head means engageable with the stock and through which the stock passes; first slide means carrying said head means and adapted to be shifted transversely of the longitudinal direction of stock advancement; second slide means carrying said first slide means and adapted to be shifted transversely of the longitudinal direction of stock advancement and transversely to the shifting movement of said first slide means; and control means for controlling shifting movement of said first and second slide means in accordance with deviation from rectilinear formation of said stock.

4. Straightening apparatus for use with a tube forming machine, comprising: head means engageable with the tube and through which the tube passes as it leaves said tube forming machine, first slide means adapted to be shifted transversely of the line of tube travel, said head means being mounted on said first slide means for rotation about the axis of the tube; second slide means carrying said first slide means and adapted to be shifted transversely of the line of tube travel and transversely to the shifting movement of said first slide means; and control means for controlling shifting movement of said first and second slide means in accordance with deviation from rectilinear formation of said tube and for controlling rotative shifting of said head means in accordance with any twisting action of said tube.

5. Straightening apparatus for use with a tube forming machine, comprising: head means engageable with the tube and through which the tube passes as it leaves said tube forming machine; first slide means carrying said head means and adapted to be shifted transversely of the line of tube travel; second slide means carrying said first slide means and adapted to be shifted transversely of the line of tube travel and transversely to the shifting movement of said first slide means; and control means for controlling shifting movement of said first and second slide means, comprising an elongated member formed in cross-section to provide two surfaces adapted to be disposed in juxtaposed relation with radially spaced longitudinally extending portions of the tube as the latter travels past said member, a pair of contact means carried in spaced-apart relation by each surface of said member, means yieldably supporting said member in juxtaposed relation with respect to the line of tube travel and providing for engagement between pairs of contact means and respective longitudinal portions of the tube, an intermediate contact means disposed intermediate each of said pairs of contact means, each of said intermediate contact means being carried by said member for movement transverse to the line of movement of the tube and being movable through contact with a respective longitudinal portion of the tube when the line of the tube between a respective pair of contact means is other than substantially rectilinear, and also comprising a pair of operating means, affected by movement of respective intermediate contact means, for operating respective first and second slide means in accordance with deviation from rectilinear formation of said tube.

6. Straightening apparatus for use with a tube forming machine, comprising: head means comprising a cluster-roll arrangement engageable with the tube and through which the tube passes as it leaves said tube forming machine; first slide means carrying said head means and adapted to be shifted transversely of the line of tube travel; second slide means carrying said first slide means and adapted to be shifted transversely of the line of tube travel and transversely to the shifting movement of said first slide means; and control means for controlling shifting movement of said first and second slide means, comprising an elongated member formed in cross-section to provide two surfaces adapted to be disposed in juxtaposed relation with radially spaced longitudinally extending portions of the tube as the latter travels past said member, a pair of rollers carried in spaced-apart relation by each surface of said member, means yieldably supporting said member in juxtaposed relation with respect to the line of tube travel and providing for engagement between pairs of said rollers and respective longitudinal portions of the tube, an intermediate roller disposed intermediate each of said pairs of rollers, each intermediate roller being carried by said member for movement transverse to the line of movement of the tube and being movable through contact with a respective longitudinal portion of the tube when the line of the tube between a respective pair of rollers is other than substantially rectilinear, a pair of switch means affected by movement of respective intermediate rollers, and a pair of motor means connected to respective first and second slide means and affected by operation of respective switch means.

7. For use with apparatus for processing elongated stock and feeding it in a longitudinal direction, head means having an opening transversely surrounding the stock and through which said stock passes as it is fed from said processing apparatus, said head means being shiftable transversely of the line of stock travel and being adapted to shift the stock transversely of its line of travel, detecting means establishing spaced points of engagement with the stock as it passes from said head means and having a shiftable member engaging said stock intermediate said spaced points and shifted by nonrectilinear formation of the stock between said spaced points of engagement, and operating means for shifting said head means in accordance with the shifting of said detecting means.

8. Means for controlling operation of apparatus for straightening stock advancing in a longitudinal direction comprising an elongated member, spring means pendulously supporting said member in floating juxtaposition to a top surface of the moving stock, means holding said member against longitudinal movement with said stock, said member having spaced-point engagement with said stock surface, a control-operating member carried by said elongated member and biased toward engagement with the top surface of the stock intermediate said spaced-point engagement, but movable in a direction away from such surface whereby it may follow said top surface of the stock and be moved by any deviation of the stock from rectilinear formation, and means acting on the stock for maintaining rectilinear formation thereof, and being operated in accordance with movement of said control-operating member.

9. Means for controlling operation of apparatus for straightening stock advancing in a longitudinal direction comprising an elongated member angular in cross-section, spring means floatingly supporting said member so that one leg is in juxtaposition to the top surface of the moving stock, means holding said member against longitudinal movement with said stock, spring means urging the other leg of said member toward a side surface of said stock, each of said legs having spaced-point engagement with the respective surface of said stock, and each of said legs having a control-operating member intermediate said spaced-point engagement and biased to engagement with a respective side of the stock but movable in a direction away from said side surface, said control-operating member following respective surfaces of the stock and being movable by any deviation of the stock from rectilinear formation, and means acting on the stock for maintaining rectilinear formation thereof, and being operated in accordance with movement of said control-operating members.

10. For use with apparatus for processing elongated stock and feeding it in a longitudinal direction, detector means for detecting non-rectilinear formation of said stock comprising an elongated member adapted for positionment longitudinally in juxtaposition with respect to said stock, spring means pendulously supporting said member in position, means restricting said member from longitudinal movement with said stock yet providing for movement of said member toward and away from said stock, spring means for urging said member toward said stock, and means at least in part carried by said member and including a portion engageable with the stock surface, the last named means being affected by non-rectilinear formation of the stock.

11. For use with apparatus for processing elongated stock and feeding it in a longitudinal direction, detector means for detecting non-rectilinear formation of said stock comprising an elongated member angular in cross-section to provide legs adapted for positionment longitudinally in juxtaposition with respect to the top and side surfaces of the stock, spring means pendulously supporting said member in position wherein the top leg is floatingly positioned adjacent to said upper surface, means restricting said member from longitudinal movement with said stock yet providing for movement of said member whereby its side leg is movable toward and away from the side surface of said stock, spring means for urging said member toward said side surface, means on the top and side leg of said member, whereby each leg has spaced-apart engagement with the stock as it moves therepast, and means on each leg intermediate the spaced-apart engagement, movable toward and away from the respective surface of said stock, and affected by non-rectilinear formation of the stock.

ISADORE J. VAN HUFFEL.

References Cited in the file of this patent

UNITED STATES PATENTS

| Number | Name | Date |
|---|---|---|
| 358,810 | Gustin | Mar. 1, 1887 |
| 358,116 | Gustin | Feb. 22, 1887 |
| 465,348 | Coffin | Dec. 15, 1891 |
| 1,457,215 | Dayton | May 29, 1923 |
| 1,535,323 | Leech | Apr. 28, 1925 |
| 1,679,362 | Knowlton | Aug. 7, 1928 |
| 2,517,343 | Picton et al. | Aug. 1, 1950 |
| 2,562,447 | Colburn | July 31, 1951 |

FOREIGN PATENTS

| Number | Country | Date |
|---|---|---|
| 22,806 | Great Britain | of 1908 |